United States Patent
Putcha et al.

(10) Patent No.: US 11,493,665 B1
(45) Date of Patent: Nov. 8, 2022

(54) MACHINE LEARNING APPROACH FOR AUTOMATED PROBABILISTIC WELL OPERATION OPTIMIZATION

(71) Applicant: OspreyData, Inc., San Juan Capistrano, CA (US)

(72) Inventors: Venkataramana Balamurugan Srikanth Putcha, Vancouver (CA); Chan Nhan Le, Ladera Ranch, CA (US); Michael Ransom Pennell, San Clemente, CA (US)

(73) Assignee: OspreyData, Inc., San Juan Capistrano, CA (US)

( * ) Notice: Subject to any disclaimer, the term of this patent is extended or adjusted under 35 U.S.C. 154(b) by 0 days.

(21) Appl. No.: 17/505,316

(22) Filed: Oct. 19, 2021

(51) Int. Cl.
| | |
|---|---|
| *G01V 99/00* | (2009.01) |
| *G06F 30/27* | (2020.01) |
| *G06F 30/28* | (2020.01) |
| *E21B 47/10* | (2012.01) |
| *G06N 3/08* | (2006.01) |
| *G06F 113/08* | (2020.01) |

(52) U.S. Cl.
CPC .......... *G01V 99/005* (2013.01); *E21B 47/10* (2013.01); *G06F 30/27* (2020.01); *G06F 30/28* (2020.01); *G06N 3/08* (2013.01); *E21B 2200/20* (2020.05); *E21B 2200/22* (2020.05); *G06F 2113/08* (2020.01)

(58) Field of Classification Search
CPC ... G01V 99/005; E21B 47/10; E21B 2200/20; E21B 2200/22; E21B 47/113; E21B 47/114; E21B 33/00; G06F 30/27; G06F 30/28; G06F 2113/08; G06F 30/20; G06N 3/08

See application file for complete search history.

(56) References Cited

U.S. PATENT DOCUMENTS

| | | | |
|---|---|---|---|
| 6,901,391 | B2 | 5/2005 | Storm |
| 2009/0182693 | A1 | 7/2009 | Fulton |
| 2011/0257944 | A1* | 10/2011 | Du .................. E21B 43/267 703/2 |
| 2013/0096898 | A1 | 4/2013 | Usadi |
| 2020/0337648 | A1* | 10/2020 | Saripalli ............... G16H 10/00 |

(Continued)

OTHER PUBLICATIONS

Oladele Bello et al., "NextGeneration Downhole Big Data Platform for Dynamic Data-Driven Well and Reservoir Management," SPE-186033-MS, pp. 1-38 (Year: 2017).*

(Continued)

*Primary Examiner* — Steven W Crabb
(74) *Attorney, Agent, or Firm* — Fish IP Law, LLP

(57) ABSTRACT

A methodology for providing set-point recommendations in an automated manner to optimize the operation of a well-producing fluid, by establishing a live synergy between physics-based simulation and real-time field data, through the employment of machine learning models. The machine learning models serve two distinct purposes in this approach: 1. Accelerate emulation of the numerical physics-based simulation to enable real-time solutions 2. Provide a probabilistic estimate of the unknown operating conditions of a well and updating the estimate based on the response to the set-point changes made, thus improving with each iteration.

6 Claims, 3 Drawing Sheets

Workflow of the automated optimization process

(56) References Cited

U.S. PATENT DOCUMENTS

2021/0117760 A1* 4/2021 Krishnan ............. G06K 9/6256
2021/0406792 A1* 12/2021 Bhardwaj ............ G06Q 10/067

OTHER PUBLICATIONS

Pankaj, Piyush, et al. "Application of Data Science and Machine Learning for Well Completion Optimization." Offshore Technology Conference—OTC-28632-MS, May 2018. pp. 1-16.

Odedele T. O, et al. "Predicting Oil Well Gas Lift Performance and Production Optimization Using hybrid Particle Swarm Optimization and Fuzzy Support Vector Machines," Proceedings of the World Congress on Engineering, WCE 2016, London, U.K. vol. I. pp. 110-116.

Putcha, Venkataramana Balamurugan Srikanth. "Integration of Numerical and Machine Learning Protocols for Coupled Reservoir-Wellbore Models: A Study for Gas Lift Optimization." 2017. Pennsylvania State University, PhD dissertation.

* cited by examiner

Workflow of the automated optimization process

Example of gas lift performance curves for possible operating states for a well period.

Table 1. Parametric Distribution Example for a Gas Lift Simulation Setup

| Example Input Parameter | Example Range | Example Step Size | Example Number of Steps |
|---|---|---|---|
| Reservoir Pressure (psi)- Downhole parameter | 500-3000 | 100 | 25 |
| Productivity Index (STB/d/psi) -Downhole parameter | 0.01-2.5 | 0.05 | 50 |
| Separator Pressure (psi)/ Tubing head pressure (psi) | 80-100 | 5 | 4 |
| Injection Depth (derived from casing pressure and GLV design) | depths of 3 valves (current operating, 1 above and 1 below) | 1 valve | 3 |
| Gas Oil Ratio (SCF/STB) | 5000-8000 | 500 | 6 |
| Water Cut (%) | 70-78 | 2 | 5 |
| Oil API Gravity | 36-48 | 4 | 5 |
| Gas Gravity | 0.66-.074 | 0.04 | 3 |
| Gas Injection Rate (Optimum Gas injection rate 0.2 MMSCFD) | 0-1.0 MMSCFD | 0.1 | 10 |

*Figure 3*

MACHINE LEARNING APPROACH FOR AUTOMATED PROBABILISTIC WELL OPERATION OPTIMIZATION

FIELD OF THE INVENTION

The field of the invention is automated machine processes.

BACKGROUND

The background description includes information that may be useful in understanding the present invention. It is not an admission that any of the information provided herein is prior art or relevant to the presently claimed invention, or that any publication specifically or implicitly referenced is prior art.

U.S. Pat. No. 6,901,391 to Storm teaches a method for modeling performance of a well system using neural networks. A neural network is trained using data sets that include (i) parameters that influence the output of a well (e.g., valve position, oil gravity, water production rate, etc.) and (ii) well outputs based on the parameters. The data sets for training the neural networks can be obtained from recorded data or derived from historical data. Once trained, the neural networks can predict how a well system will respond to a select group of parameters that influence well output.

U.S. Pat. No. 6,901,391 and all other publications discussed herein are incorporated herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

US Patent Pub. No. 2013/0096898 to Usadi teaches a machine learning algorithm (e.g., a neural net) that is used to obtain solution surrogates used to simulate fluid flow in a reservoir. The machine learning algorithm uses training parameters that include state variables (e.g., pressure, composition, saturation, fluid properties, fluid flow) and boundary conditions (e.g., conditions of an actual boundary and rate of flow of oil across a boundary of a sub-region) to obtain the solution surrogates.

US Patent Pub. No. 2009/0182693 to Fulton teaches a neural network for determining parameters (e.g., effective permeability, reservoir porosity, and water saturation) that increase oil and gas production from existing production zones. Fulton contemplates training the network using measurements of reservoir effective porosity, water saturation, effective permeability, bulk density, neutron porosity (neutron emission by a source indicating porosity of rock), and formation resistivity (indicates how much oil is concentrated in a region). Additionally, Fulton contemplates the use of genetic algorithms to run optimizations on the parameters described above.

The storm patent is focused on reservoir/production management primarily by adjusting the production through varying choke sizes. The response to the variations in inputs is directly used to train a neural network. Hence, there is no element of uncertainty quantification and no use of physics-based models to gain a greater understanding of the underlying distribution of various unknown parameters. Such a method is highly vulnerable to the noise in the system, as is the case with well operation optimization, as the well undergoes transition. A setpoint value considered to be optimum for a well at a given point of time may not continue to be so in future due to the effects of decline.

The Usadi and Fulton patents are focused on History matching/Model calibration to only predict the ranges/values of reservoir properties and simulate fluid-flow inside the reservoir. They are not involved in any kind of adaptive optimization and learning through field implementation.

Pankaj et al. (SPE, OTC-28632-MS) describes a methodology for optimizing well-completion. Optimizing the completion is a design optimization problem, which can differ significantly when compared to the optimization of operation. Further, Pankaj performs model calibration based on history matching reservoir and hydraulic fracturing simulation parameters based on microseismic, production and pressure transient test data. Subsequently, they have provided predictions based on this history matched proxy-model. Based on the calibrated model, they have provided optimized design recommendations. In the current invention, learning occurs through field implementation and continuous reduction of probability space of the uncertain parameters, this helps to zero in on the underlying parameters with time and having a closed loop system.

Odedele and Ibrahim (WCE2016 pp110-116) is used hybrid particle swarm optimization and support vector machines to arrive at a global optimum for gas lift operation. This global optimum involves the variation of controllable surface parameters. The uncertainty in the downhole parameters is not addressed, the reservoir pressure and productivity index of the well are assumed. The current invention encompasses the uncertainty of downhole parameters while providing predictions.

V. B. Putcha, T. Ertekin (SPE, SPE-192368-MS) involves the development of a coupled reservoir-wellbore simulator and neural networks developed for accelerating predictions for wellbore performance and gas lift optimization. The gas lift optimization is based on an assumption that the reservoir is a radial cylindrical system with homogeneous properties and that gas injection rate will remain constant. When compares to our current invention, this paper is not probabilistic in nature and does not include inverse modeling, and adaptive learning from field implementation.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for improving machine learning approach by the automation of operations optimization, the isolation of special states to avoid interference, the usage of transfer learning based neural networks to generate high resolution, high-accuracy physically consistent well specific simulation and the adaptive learning through field implementation aspect of the current invention that are significantly different from the cited references.

SUMMARY OF THE INVENTION

The inventive subject matter provides apparatus, systems and methods for improving an automated machine process, by executing the following four steps in a cyclical manner, (1) data gathering, (2) data simulation, (3) data inverse modeling, (4) recommendation.

Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Production of fluids from a well is dependent on the knowledge of the operational conditions of a well and its associated reservoir, along with other unknown parameters such as interference of stimulation jobs in nearby wells, and the extent of wear and tear on equipment and its impact. Additionally, when looking to maximize the economic benefit from a well at a given point of time, the operational expenditure can be inversely associated with production maximization. To recommend a set-point for an operational parameter that optimizes well performance at periodic intervals in light of the above-mentioned parameters is a significant challenge. Some examples of such optimization problems are adjusting the gas injection rate on a gas-lift well in order to maximize production by minimizing back-pressure on the well while accounting for gas injection costs, finding the right frequency on an Electrical Submersible Pump (ESP) to maximize production by identifying the placement of the well's operation with respect to the pump performance curves while accounting for electricity costs.

Historically, the set-point has been decided upon by an operator based on experienced estimates of the well characteristics and usage of simulated models, of which, the development, parametric analysis, and model matching and selection is a manually intensive process. The present invention automates the process of live information ingestion, data merging, data clean-up, real-time generation of relevant simulations, probabilistic estimation of model relevance, set-point recommendation, response capture, adaptive updating of the model and improved recommendations over time.

BRIEF DESCRIPTION OF THE FIGURES

FIG. 3 is Table 1, showing an example of the parametric distribution.

DETAILED DESCRIPTION

Figure 1:
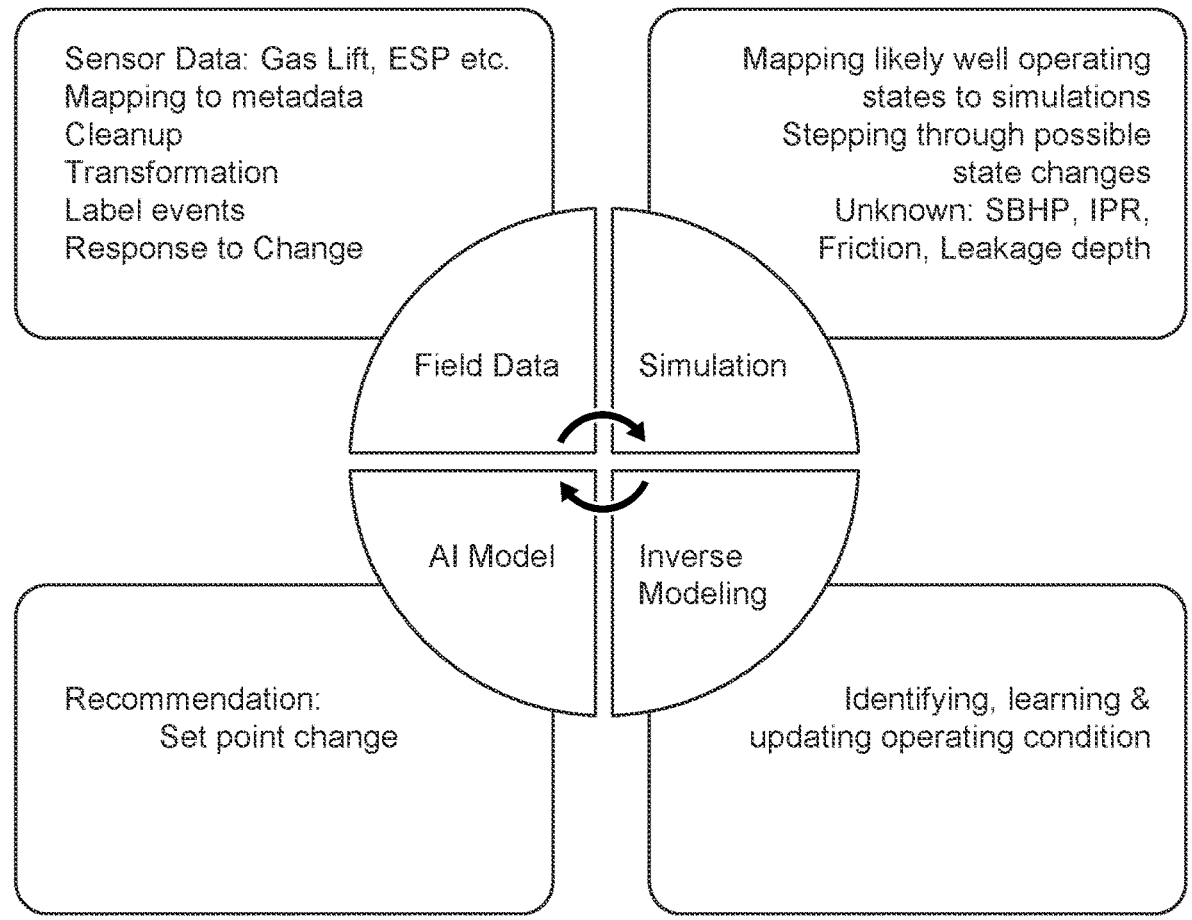
FIG. 1 is a summary of the workflow involved in the implementation of the current inventive subject matter.

Referring now to FIG. 1, the inventive process can be described as four steps that operate in a cyclical manner:

Step 1—Data gathering and transformation: A first and crucial step for an automated process is setting up a system to collect data from the sensor feed recording the pressures, temperature and other relevant signals from the wells. The name of the well, the timestamp at which the sensor value is recorded is stored. The sensor data is mapped to the associated well metadata, some examples of which include the well design and completion parameters such as the depth and operating pressures of the gas lift valves, the performance curves of the ESPs. Subsequently, the data is cleaned up to identify and remove outliers. Further transformation of data is performed to get features out of the raw data. Some examples of such features include estimation of the operating gas lift valve, identification of flowing or shut-in state of well and recording such information as a boolean filter, estimation of oil, water production rates from tank sensors and estimation of gas-oil or gas-liquid ratios set intervals. Events or states of the well which need special treatment for example interference from other wells, compressor instabilities, and shut-ins are labeled. These labels are used to train supervised machine learning models to identify and act upon such special states. Examples of such supervised machine learning models may include random forests, neural network based sequence models or support vector classifiers. Models are also developed to identify changes in set-point based on thresholds and isolate periods prior and posterior to such a change for evaluation.

Figure 2:
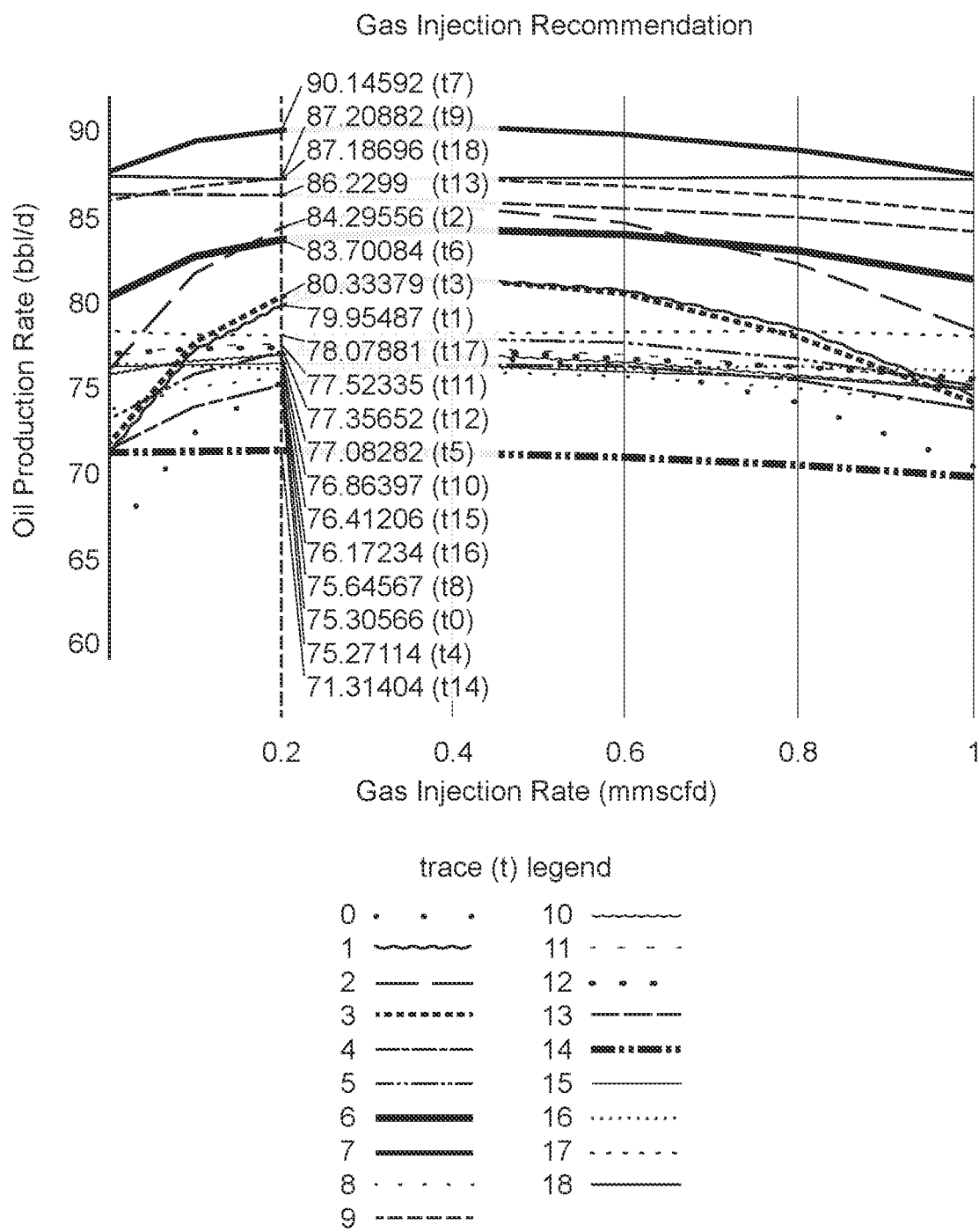
FIG. 2 is an example of gas life performance curves for possible operating for a well period.

Step 2—Simulation: This step is explained with an example simulation setup for an optimization process for a gas lift operation. The objective of gas lift optimization is to maximize the oil production rate increments per marginal increment in the gas injection rate. FIG. 2 shows a gas lift performance curves generated for example cases resulting from a combination of parameters.

Step 3—Inverse modeling: Simulation generates non-unique solutions, there can be several combinations of simulation inputs which provide the same output. In order to identify the most likely operating state of the input parameters, a probabilistic approach is used. Based on the transition of matching simulation cases producing the oil rate output at a given state, prior to and after a setpoint change, the probability of a given simulation case to be representative of the real well is learned and updated. The probability distribution of unknown states transitions over time as the well and reservoir transitions, but these can only transition to proximate states. A state space model is used to determine the probability distribution of unknown states at time t[0] based on the corresponding distribution at times t[−1], t[−2] ... t[−n] in conjunction with the matching simulation cases. The learning improves more significantly as the well is perturbed changing its operating state which occurs during past changes in set points, as well as ongoing changes from implementing recommendations.

Step 4—Recommendation: Based on the probability assigned to simulation cases from the inverse modeling step, the expected economic value of a set point change in either direction or by holding at the current state is assessed. The operating costs and the revenue generated at various set points are inputs to this model. Based on this, the model generates a recommendation to either change or to hold the current operating setpoint. This recommendation is communicated to the well site and/or the operator through a cloud-based well monitoring platform. The implementation can be done at the well site or through a remote controller triggered by manual input, or by any automated or manual control device.

FIG. 2 depicts an example of gas life performance curves for possible operating for a well period.

Estimating the optimum set point of gas injection using a physics-based model involves developing simulations which take various input parameters along with the gas injection rate and predicts the oil production rate. The input parameters can be either measured or assumed. To provide a recommendation for a certain well, a lookback period is used to measure the statistics of each parameter to account for the variance.

The bottom-hole parameters usually are not measured for months at a time and have a greater degree of uncertainty, hence a wider or full range of possibility is considered for them, with each time-step, the degree of uncertainty of the parameter goes down. For the parameters which can be measured the data recorded by the sensors is captured and cleaned to remove outliers. Here is a sample (hypothetical) input matrix for one such run. To start with, a uniform distribution is used for each of these parameters.

Additional to these time-dependent input parameters shown in Table 1 of FIG. 3, there are parameters which are fixed for a life of a well, such as the deviation survey data of the well. For the purposes of consistency, the deviation survey data has been translated and simplified into 6 points: 3 True vertical depth points at 0.70 and 90-degree inclination respectively of the well and their corresponding measured depths. Combined with the deviation survey, we have 15 input parameters per well per time period. For such an evaluation the total number of simulations to be run is 67.5 Million. It takes years to run this quantity of simulation per recommendation per well. To circumvent this problem, a neural network based solution is used for achieving high-speed computation with minimal loss of accuracy.

The rate of physics-based simulation using a commercial wellbore fluid flow simulator has been observed to be between 12,000-50,000 simulations per day. At this rate, it takes years to generate recommendations. Also, considering the variation in deviation data of wells, the simulation data runs for one well may or may not be applicable for another well. Hence, a neural network-based approach was selected to solve this problem. The neural network is trained on randomly generated data samples in the order of 200,000-300,00 cases which can be generated in 15-20 days. The neural network is trained on the distribution of randomly generated synthetic well-deviations. This base neural network model can be a biased model as it tries to minimize the error across all cases. Such a model trained on randomly generated synthetic well data is observed to have an R-squared value of 0.8-0.96 when tested on simulations generated for real wells. A transfer learning protocol is used to generate well-specific models with high accuracy of R-squared which is consistently in the 0.950-0.999 zone. This is achieved by generating a relatively smaller sample of well-specific simulations in the order of 500-5000 and retraining the final layer of the neural network while freezing the other layers at the time of retraining. The Well specific neural network model achieved through transfer learning can generate the results for 1 Million simulations in less than 10 seconds while the physics-based simulator will take between 20-80 days for the same. This is what makes it possible to have real-time optimization recommendations for thousands of wells while incorporating the effects of uncertainty, variance, and transition.

The system follows a closed loop after a change is made to the setpoint, the response to the change is assessed using the field data sensor stream and data processing technique as described in step 1. The model updates itself on a platform by following steps 1 through 4. Examples of such a platform could be cloud-based, a fully connected on-premises platform or an edge device.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C ... and N, the text should be interpreted as requiring only one element from the group, not A plus N, or B plus N, etc.

What is claimed is:

1. A method of using a neural network based solution to provide real-time set-point recommendations for an operating well, comprising:

step 1:

collecting data from a sensor feed;

mapping the sensor feed data with a well-specific design metadata of the operating well, the well-specific design metadata selected from the list consisting of the depth and operating pressures of the gas lift valves, the performance curves of the ESPs, deviation survey data, well design, and completion parameters;

cleaning up the sensor feed data through outlier detection;

step 2:

using both the sensor feed data and the well-specific metadata to derive features to use in a physics-based simulation;

running the physics-based simulation with synthetic data randomized to produce a first set of simulation data;

using the first set of simulation data to train a neural network;

running the physics-based simulation with well-specific data for the operating well, to produce well-specific simulation data;

retraining the neural network using the well-specific simulation data;

using the retrained neural network to create a second set of simulation data;

step 3:

applying inverse modeling to the second set of simulation data to produce a probability distribution of unknown input states for the operating well;

step 4:

use a highly probable value of the unknown input states as an input to the physics-based simulation to produce an automated set-point recommendation; and implementing the recommendation at the well.

2. The method of claim 1, wherein the step of cleaning up the sensor feed data comprises identifying and labeling of an observed state that can interfere with the method of providing real-time set-point recommendations.

3. The method of claim 2, further comprising training of a supervised machine learning model to identify the observed state.

4. The method of claim 3, wherein the supervised machine learning model comprises at least one of the groups consisting of a random forest, a neural network model based on a sequence model and a support vector classifier.

5. The method of claim 2, further comprising training the supervised machine learning model to act upon the observed state.

6. The method of claim 1, further comprising following implementation of the recommendation, updating the inverse modeling by re-doing steps 1 through 4.

* * * * *